United States Patent [19]

Brelén et al.

[11] 4,210,432
[45] Jul. 1, 1980

[54] METHOD FOR CONTROL OF THE SURFACE WEIGHT OF A MINERAL WOOL MAT

[75] Inventors: Hans E. O. Brelén, Skövde; Arvid S. Dahlberg, Tidan; Ulf L. Åberg, Skövde, all of Sweden

[73] Assignee: Rockwool Aktiebolaget, Skövde, Sweden

[21] Appl. No.: 921,882

[22] Filed: Jul. 3, 1978

[51] Int. Cl.² ............................................ C03B 37/00
[52] U.S. Cl. ........................................ 65/4 R; 65/9; 65/29
[58] Field of Search ............ 65/2, 4 R, 9, 8, 15, 65/29, 163, 164

[56] References Cited

U.S. PATENT DOCUMENTS 3,539,316  11/1970  Trethewey .............................. 65/2

FOREIGN PATENT DOCUMENTS 2729146  1/1978  Fed. Rep. of Germany ............... 65/9
484193  12/1975  U.S.S.R. ................................. 65/9

Primary Examiner—Robert L. Lindsay, Jr.
Attorney, Agent, or Firm—Larson, Taylor and Hinds

[57] ABSTRACT

A method is provided for controlling the surface weight of a mineral wool mat in a process in which fibers of mineral wool are produced by spinning a mineral melt and the mineral wool formed from the fibers is transferred to a collection device using a stream of gas which is separated from the mineral wool in the collection device, the mineral wool forming a mat on a collection band. The method concerns measuring at least two variables which influence the amount of mineral wool formed per unit time and predicting, based on these measurements, the production of mineral wool at a predetermined future point in time. The surface weight of the mineral wool mat is measured along with the speed of the collection band and these quantities are used to determine the actual amount of mineral wool produced at the predetermined time. The values corresponding to the actual and predicted amounts are compared to determine the error in the latter and this information together with updated measurements of the two variables is used to make a new prediction.

57 Claims, 1 Drawing Figure

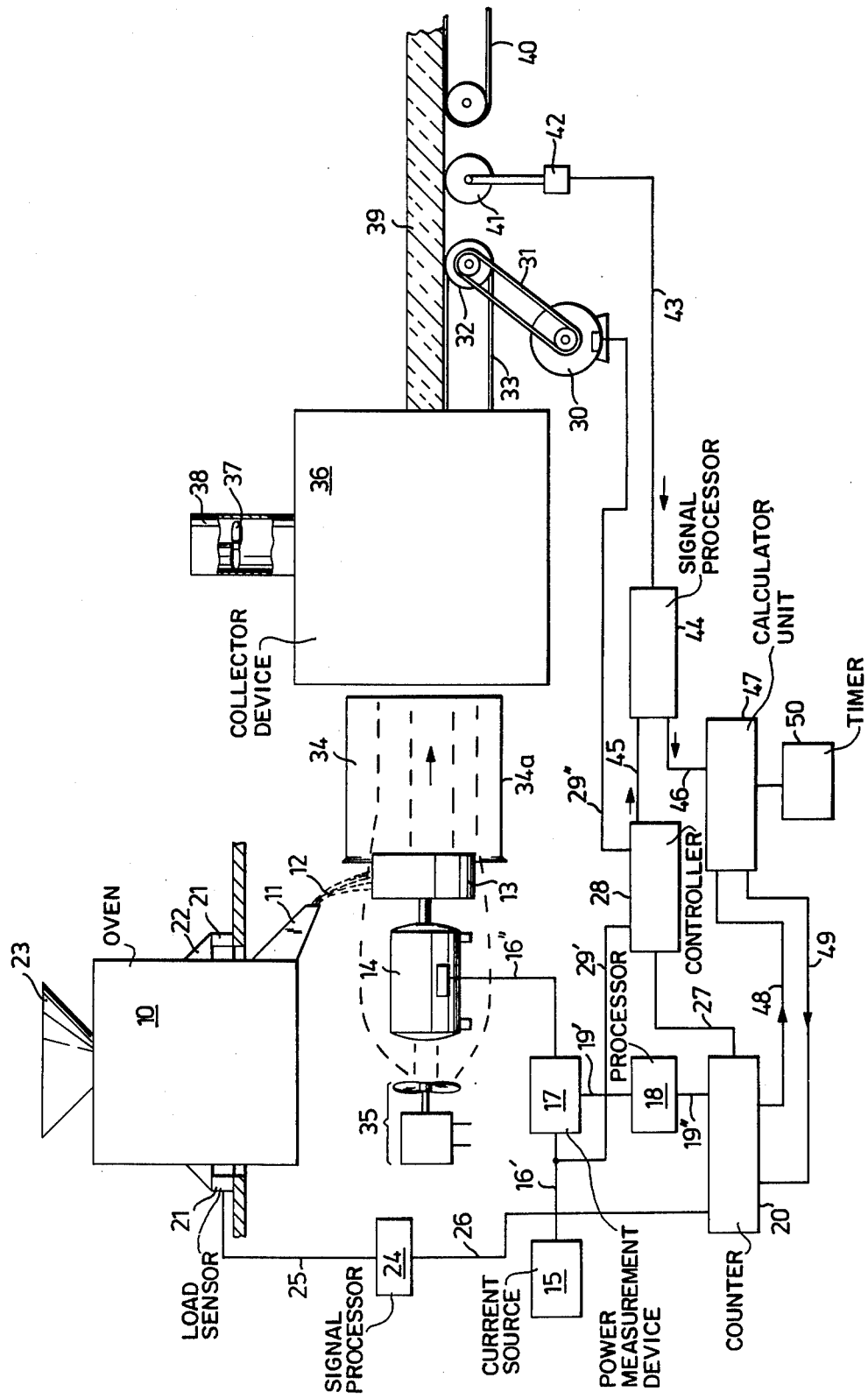

METHOD FOR CONTROL OF THE SURFACE WEIGHT OF A MINERAL WOOL MAT

In the production of mineral wool a melt of mineralic raw material is first produced. As melting system one may use cupola ovens, fans, electrode ovens and so on. As a rule, there is for each type of raw material melt one or more melting systems providing technically acceptable operation. For other melt material compositions and working conditions, other melt systems may again be used. In the production of mineral wool one usually causes the melt continuously to flow to one ore more fibration assemblies or aggregates. There is also with respect to the fibration aggregates a great number of possibilities, but in each separate case nevertheless the choice of a suitable fibration aggregate and suitable fibration methods is more limited. Amongst fibration systems for the production of mineral wool those are the dominating ones, which use rotational bodies for throwing out fibres of mineral wool in combination with gaseous currents for collecting the mineral wool and transfering it tp a collection means, usually a continuously moving band.

An often used system for the production of mineral wool comprises a cupola oven working with coke as its substantial burning material. The cupola oven is charged with a mixture of the material concerned, for instance stone, and coke, and in the cupola oven the material is rendered molten by the heat developed by the coke during its combustion, when blast air is injected into lowermost part of the oven. Through an outlet opening in the lower part of the oven, then melt will flow out continuously. By means of a system of melt furrows the melt is conducted to a fibration aggregate, usually comprising two to four so called spinner wheels, mounted each on one horizontal shaft at substantially the same vertical level. The spinner wheels are so arranged that the melt will first hit one of them and thereafter be thrown over to the next one and so on. From the spinner wheels the melt moves in the form of a great number of threads, which, due to the centrifugal force and possibly also under influence of an air or gas curtain or veil moving around the spinner wheels and more or less completely surrounding them, will be reshaped into fibres. By influence of the gas movement, the fibres thus formed are thrown away from the fibration system. Thereafter a separation of the transportation air and the mineral wool takes place, and the mass of mineral wool fibres, which is rather often combined into mineral wool pellets is formed into a comprehensive mineral wool mat.

A basic problem in the production of mineral wool has been to provide an even and pre-determined surface weight of the mineral wool mat. From the mineral wool mat, as a matter of fact, during its continuous treatment mats or discs or the like will be produced in given thicknesses. The surface weight proper of the mineral wool mat thus will be completely indicative to the density which is obtained by the final mineral wool products. The density of the mineral wool products is of essential importance for wear and other properties but also, of course, for the production costs of same. If a given density is necessary for achieving certain properties of the produced product, then there is a very great economical interest in said product not having more or less a hazaradly varying density, which may essentially exceed the desired one. Therefore one tries to provide that the mineral wool products produced shall possess densities which are within very narrow limits. This, in turn, will give rise to corresponding demands on the surface weight of the mineral wool mat, from which the mineral wool product is produced. If now the mineral wool mat would move at a constant speed, and the production of mineral wool would simultaneously be at a constant and pre-determined rate, them also the surface weight of the mineral wool mat would be constant and pre-calculatable. However, the production of mineral wool varies from one moment to the next one. This caused that one tried to control the propagation speed of the mineral wool mat such that the said variation should be compensated for, so that at a decreasing production the speed of movement of the mat would be smaller and vice versa.

It has previously been found that if mechanical forces are used for the fibration, the need of power for the fibration system is in a given relation to the amount of mineral wool formed, even if this relation is not completely constant. As a matter of fact, if more melt is fed to the fibration system, this will require a greater amount of power and vice versa, but simultaneously with an increased feed of melt, more mineral wool is also formed. These circumstances are more clearly described in the Swedish patent specification No. 165.153. An other possibility of control comprises continuously measuring the amount of melt, given off per unit of time from the melting system (the melting oven). This, for instance could take place by continuously or at given short intervals of time measuring the weight of the melting system along with the melt existing therein and in this way stating the decrease of weight per unit of time. In the Swedish patent specification No. 76/07.601-7 it has been proposed to combine these two possibilities and thus to introduce in cooperation into a fibration procedure the need of power of the fibration system and the decrease of weight of the melting system per unit of time. This combined method of control has given a better result than could be obtained by each of the twp control methods separately.

However, it has proved, that also with the last mentioned method of control it has not been possible to do away with all of the reasons for variations in the surface weight of the mineral wool mat and to keep this surface weight completely constant or at least sufficiently constant for satisfying the above mentioned desires. Thus it has proved that further factors, in part of a known character and in part of a character which is not yet known, influence the production of mineral wool per unit of time, and that the last mentioned factors do not receive any complete expression and in some cases even no expression at all in the decrease of weight of the melting system, nor in the need of power for the fibration system. Such variation, occurring due to the last mentioned factors, therefore also gives no reason for any corresponding change of the speed of the mineral wool mat, and the consequence then will be that there will still exist variations in the surface weight of the mineral wool mat.

The basis of the present invention is a thorough study of these factors, hitherto very little regarded or even not regarded at all, as well as their influence on variations of the surface weight of the mineral wool mat. Thereby it was possible to prove that the said factors may be due to varying composition of the material in the melt, running out from the melting system, further to the purely mechanical construction of the fibration system, further to the way in which the melt is fed to the fibration system and most probably to further circumstances not yet understood. Per se it would even be possible that one could more or less satisfactorily register these variations but it would scarcely be possible to measure all for the said reasons of variations, and every attempt to carry out such an operation would also result in such a complicated system, that it would from the point of control be impossible to make or to use it.

The present invention relates to a method and an arrangement by which one has tried to find a solution of the problem mentioned above, both regarding its aspects previously known and regarding its aspects perhaps not yet known. This solution shall satisfy high demands for effectivity and flexibilty.

The invention, thus, in first place, concerns a method for controlling the surface weight of a mineral wool mat in a procedure for its production, in which mineral wool is produced by fibration of a mineralic melt, the mineral wool formed is transferred by means of a stream of gas or air to a receiver system, in which the gas or air, resp., is separated from the mineral wool, and the mineral wool forms a mat on a collection band, and in which one or more variables, influencing the amount of mineral wool formed per unit of time is measured, said variables being introduced into a functional or operating system, and finally the speed of movement of the collection band for the purpose of controlling the surface weight of the mineral wool mat formed being controlled by means of a control unit in accordance with the amount of mineral wool formed during each unit of time, expressed in the form of the functional system, in which the variables have been introduced.

According to the invention, the surface weight of the mineral wool mat formed is determined, for instance by weighing. The functional system is made to be responsive to one or more parameters, the value or values, resp., of which being changed under the control of a calculator unit, which starting from the expression for the amount of mineral wool formed per unit of time and derived from the said functional system, as well as from the corresponding expression obtained from the surface weight of the mat and the speed of movement of the collection band, determines the parameter value or the combination of parameter values, which would, during one or more measuring periods before the actual measuring period, have given the smallest difference between these two expressions.

The invention also regards an arrangement for the execution of the said method.

As the process variable, which is correlated to the amount of mineral wool formed during a unit of time, one may advantageously in the way indicated in the above mentioned Swedish patent specification No. 76/07.601-7, provided that mechanical forces are used to some extent for the fibration, use the power requirements of the fibration system and/or the amount of melt given off by the melting system per unit of time, for instance determined by means of the decrease of weight of the melting system per unit of time, the latter being used as a process variable, and correlated with the amount of mineral wool formed.

Other examples of other process variables correlated to the amount of mineral wool formed per unit of time include: the tightness of the stream of mineral wool leaving the fibration system, the thickness of the jet of melt fed to the fibration system and so on.

The weighing of the mineral wool mat formed suitably takes place by means of a roller or a short band, supported or kept on so called load indicators, which are means which dependent upon the load or the pressure to which they are subjected, create a preferably electric signal, for instance a voltage or a frequency dependent upon the pressure or the load, resp.

Many of the process variables which may thus be considered are subject to both short periodic and long periodic variations. In addition thereto they are subject to disturbances of many different kinds, but these disturbances as a rule are of short periodicity. This is the reason why one prefers to use, according to the invention, instead of or, in any case along with, momentary values of the process variable concerned, a mean value, determined by guidance of the value of said variable during a closely antecedent, very recently elapsed period of time. Thereby it is also advantageous that one allows such a mean value, which is derived only a short time before the moment of control proper, to have a stronger influence than a mean value, which is derived more far back in time. One may also express this relation by means of the following formula:

$$P_n = p_n + f \cdot P_{n-1} + f^2 \cdot P_{n-2} + f^3 \cdot P_{n-3} +$$

In this formula $P_n$ is the representative, retrospective estimation of the process variable, whereas $p_n$, $P_{n-1}$ and so on indicate estimations of the variable p at a time before the time of observation, at the times n or n−1 and so on. The factor f finally may be the reduction or weighting factor, meaning that the value of provides less influence at a time which is more far away in time, i.e., the grater the time which has elasped the lesser the influence. This factor, therefore shall at this execution of the invention be less than 1. The value of the factor f, of course, must be chosen with respect to how close together the observations are made. If an observation is made every five seconds, the factor f may suitably be chosen equal to 0.9. The shorter the intervals between the observations are, so much less shall be the differences in value of the factors f, $f^2$, $f^3$ and so on.

The functional relation may be expressed as a formula. This may be of many different kinds. If for instance, there are only two process variables contained in the control procedure, below indicated as p and q, then the said formula may be written as $$F(p, q) = a \times p^n + b \times q^m + c;$$

In this formula a, b, c, n and m are different parameters. The parameters n and m have proved suitably to be in the order of magnitude between 0.5 and 2. Another functional relation which may be used is the one manifesting itself in the following formula:

$$F(p, q) = a \sqrt[s]{p^n \times q^m} + b;$$

In this formula, as in the earlier one, p and q are process variables, whereas a, s, n, m and b are parameters. Also in this case, suitably, the parameter values of n and m should be within the interval of 0.5 to 2. It has proved suitable that the value of s is equal to the sum of n and m.

In addition to the two functional relations mentioned above, also other functional relations may be concerned, and what functional relation should be used in the individual case is dependent upon many different circumstances, amongst which may be mentioned, the type of equipment for the production of the mineral wool, the calculator available, the accuracy one desires to achieve in the individual case and so on.

If, in the formula first mentioned above, the parameters n and m occuring as powers are put equal to 1, one will obtain a simplification which is acceptable for many cases, said formula reading $$F(p, q) = a \times p + b \times q + c;$$

The invention will be further described below in connection with a form of execution, i.e., embodiment shown in the attached drawing, but it is understood, that the invention shall not be limited to this specific form of execution, but that all different modifications may occur within the frame of the invention. In the drawing there are certain components only indicated by means of block diagrams, but as soon as the man skilled in the art has the knowledge from the above about the general principle of the present invention, he will have no difficulty in constructing useable forms of these components.

The mineral melt, in the form of execution shown in the drawing, is obtained from a melt oven 10, which is charged at its upper end with a mixture, prepared in advance of minerals, e.g. some suitable stone-variety in a suitable magnitude of crushing, and burning material, the last mentioned preferably in the form of coke, which is burnt in the oven thereby melting the mineral, whereafter the melt is tapped off at the opening 11 at the lowermost part of the oven 10 in the form of a stream 12, which is fed to a spinning unit, here represented by one single spinner wheel 13.

Of course, it is of no great importance to the invention, that the melt oven 10 is shown in the form of a cupola oven, but all melt oven constructions, known per se, may as well be used, for instance an electric electrode oven.

The spinning unit 13 is driven by means of a motor 14, which gets its current from conductor or conduits 16', 16" from a source of current 15 such as an electric distribution net work. For a purpose which will be explained in the following, a power measurement device 17 is connected into the conduit 16. In some way, which does not form part of the present invention, the indication from the power measuring instrument 17 is, over the conduit 19' transferred to a power indication processing instrument 18 and over the conduit 19" from this instrument to a counter 20.

The form, of the indication from the instrument 17 or from the power indication processing instrument 18, resp., may principally be of any suitable type, which is useable within traditional data treatment or processing techniques; for instance said indications may comprise a pulse train with a pulse frequency which is distinctly determined by the power, but also other forms, knwon per se may be used. The type of indications has no critical importance to the present invention.

The melt oven 10 is elastically or resiliently supported, and in some suitable way one or more pressure or load sensors 21 are provided in the elastically resilient carrier, for instance such that the sensors 12 are arranged so as to be symmetrically distributed around the circumference of the oven and engage feet 22 of the oven 10. In this way sensors 21 will indicate the weight of the oven along the molten or non-molten, burned or non-burned material existing therein. As the weight of the material is decreased by melt being removed the form of the stream 12 to the spinning unit 13, or as the weight increases by further material being fed through the charge opening 23 to the oven 10, its total weight will change. The weight is transferred over the conduit 25 to a treatment unit 24. The indication of weight is treated in the said treatment unit 24 such that the output conduit 26 to the counter 20 will not indicate the weight but only the changes of weight caused by the take off of melt by the stream 12, also in this case for instance in the form of a pulse train of a frequency dependent upon the change of weight.

In the counter unit 20, thereafter, a processing or treatment of the two indications will take place, coming in through, i.e., supplied by the conduits 19', 18, 19" and 25, 24, 26 with consequence that a control magnitude will exist, i.e., a control signal will be produced in the output conduit 27 to the controller 28. This controller 28 determines in turn over the conduit 29', 29" the speed of an endless band 33, forming the collection band for the mineral wool mat 39 being produced.

In this connection it should be observed that the mineral wool in the shown form of a spinner unit will be created in a way, known per se, by thin threads of the melt being thrown out from the spinner wheel or wheels, resp., in the spinner unit and being caught by a stream of gas or air, driven forward by means of a blower 35, preferably under guidance from a jacket 34a, so that mineral wool will along with this gas or air be transferred to a collector device 36, in which, for instance, spraying with different compositions may occur in a way known per se, and in which the gas or air, resp., is separated from the mineral wool and is drained off, as is indicated schematically by the chimney 38 and the suction fan 37. The mineral wool is deposited in its turn on the part of the collection band 33, not visible in the drawing, so that it will be removed in the form of a mat 39.

From the collection band 33, the formed mineral wool mat 39 is removed over one or more transportation bands, for instance the conveyor band 40, in order to be further treated in one way or another in a manner which does not form part of the present invention.

In the parts, hitherto described, the arrangement is known from the above mentioned Swedish patent specification No. 76/07.601-7.

As mentioned above, however, tests which have been made have indicated that one will certainly by means of this arrangement gain rather substantially regarding constancy of the surface weight of the mineral wool mat produced, but that there are created disturbances of a type in part known, in part not yet completely discovered or understood, said disturbances nevertheless causing a non-desired variation in regard of surface weight of the produced mineral wool mat 39. The purpose of the present invention is to provide a remedy in compensation for these disturbances.

Between the two conveyors 33 and 40 mentioned above a balance device is introduced, said device having the purpose of continuously during the movement of the mat 39 to measure its surface weight. One type of such a balance device is described in the Swedish patent specification 76/06.381-7. Schematically, this balance device is shown in the form of an easily rotating roller 41, which is, as to its weight proper, very light, and which rests on a weight sensor means 42. Also in this respect, it is without material importance to the invention how this weight sensor means 42 is constituted. For instance it may contain an oscillator which produces a pulse train of a pulse frequency dependent upon the weight. The pulses of this pulse train are thereafter transferred through the conduit 43 to a signal treatment unit 44, which calculates the mean weight of the mineral wool mat and produces an indication of this mean weight. This calculator unit 44 is provided over the conduit 45 with signals related to the speed of the band and supplies, over the conduit 46, to a calculator unit 47 signals related to the real production, i.e., actual operation, calculated from these data, said unit, similarly to the other calculator units in the system, being of some type known per se from the prior art.

The calculator 47, however, is not only fed with a signal related to the real production according to real surface weight and real speed of the band, supplied from or transferred over the conduit 43, 44, 46, but also with a signal relating to the so-called, pre-supposed production, transferred from the counter unit 20 over the conduit 48, such as this production will appear from the functional relation mentioned with the parameters and variable values contained therein.

The calculator unit 47 is connected to a timer or time indicator network 50, causing each calculation operation in the calculator unit 47 to take place in timed sequence after one other and in an integrated form within pre-determined intervals of time. The resulting instruction or output, then, will be supplied at pre-determined intervals of time exemplified above as five seconds to the counter unit 20 over the conduit 49.

It will now be seen, that one has in this way provided firstly a prognosis or production in the form of the said functional relation of the amount of mineral wool produced per unit of time, and that one may from this prognosis derive an estimation of an adapted speed of the mineral wool mat, which is taken care of by the counter unit 20, which functions therefore as a control unit with respect to the produced surface weight. One also measured the real production. Normally a difference will appear between these two statements about, i.e., signals related to the production, even if the difference in time is taken into account. In the calculator unit 47 a parameter is then chosen, which, if used in the counter unit 20 would have given the smallest difference during a given earlier period of time. If the values of the parameters in the functional relation, thus found by the calculator unit 47 to give the smallest difference, do not agree with the values contained in the functional relation programmed into the counter unit 20, then an automatic re-programming will be initiated from the calculator unit 47.

If now, for instance due to a change in the temperature or the viscosity of the melt, the relation between amount of melt, produced from the melting system 10, and the amount of mineral wool, received by the band 33, would change, then this means that the functional relation which earlier gave the most advantageous prognosis as far as the amount of mineral wool produced and the surface weight thereof, and which was based upon a given change of the flow of melt, will now give an erroneous prognosis. For this reason a difference will appear when comparing mineral wool actually produced, on the one side, and the existing prognosis on the other side. This difference causes that the calculator unit 47 will find a new functional relation, giving a better prognosis.

Comprehensively, it can therefore be said that previously known techniques made it possible to observe existing errors in the adjustment and, guided thereby, to correct the errors as far as regards a subsequent production of mineral wool. By the present invention the same errors are observed, but they are integrated and are introduced into a functional relation, which has for its purpose to anticipate future errors and, in advance, to correct them by means of a prognosis.

In some phases of the production, especially at starting and stopping of the system, or for sudden interruptions in the work of the system, it may be difficult or even impossible to create a so called "feed-forward" control, which is possible to use for its purpose. By this, the control of the speed of the band will suffer. By introducing in combination with this feed-forward control a conventional feed-back control, a correction of most of the errors in question will be created. This feed-back control also provides security in the case of the feed-forward control would cease to function or function improperly, and vice versa. A feed-back control may, without the introduction of any new element, be provided by the surface weight determined by weighing the mineral wood mat being compared with the surface weight which forms a desired value for the control of the speed of the band caused by the control unit 28. A difference, perhaps obseved thereby, may then in a way known per se be arranged to influence the control of the speed of the band in addition to the control, starting from the prognosis, of the amount of production obtained from the counter unit 20. The mutual relation between the two control systems, of course, may vary. Tests have proved that a combined weighing with equal weight influence as a rule will provide good results.

It is also possible, if desired, to arrange for a switching device for connecting the indications from the one control, e.g. for switching in the feed-forward control or for removing it, or for switching in the feed-back control or for removing same, especially at a starting period or a period for stopping the system, or if any of the controls should deviate from a pattern of operation determined in advance.

It has proved advantageous in the execution of the described method to additionally control the speed of movement of the collection band 33 by means of a controller, for instance of the PI-type, acting on basis of the surface weight of the mineral wool mat such as is determined by weighting the same. This additional or supplementary control thereby may be brought to influence the speed of movement of the collection band to same extent as the main control, initiated from the amount of production predict by means of the functional relation.

As mentioned above, the production of mineral wool is controlled by rather a lot of circumstances or parameters in addition to the ones specifically mentioned above, and these circumstances also have been subject to an extensive investigation, whereby it proved possible in part to explain their influence, but to some extent it was only possible to state that this influence existed. Nevertheless one has found that a plurality of these parameters will give an expression for the amount of mineral wool formed per unit of time, which is especially suitable to be introduced in the prognosis mentioned above. Therefore, if it is desired to use any one of these circumstances for the purpose of the present invention, either each per se or in co-operation with any other one of the said circumstances, so as to create a preferably electrical expression for the circumstance or circumstances concerned, it will be possible from said expression to read, i.e. determine the amount of mineral wool formed per unit of time, and to introduce this expression into the above mentioned functional relation.

Amongst such circumstances, the following ones may be mentioned

It has been found that the gas, the air or the mixture of gas and air, used to transport the formed mineral wool from the spinner aggregate 13 to the collection band 33 or to any subsequent band, e.g. the band 40, and which is separated in the collection band, is a carrier of properties strongly indicative of the properties of the formed mineral wool and thereby indicative of the amount of mineral wool depositied per unit of time on the collection band. The gas concerned or the air or the mixture of gas and air will be denominated below the "transport medium".

Thus, it has been found that if you provide the movement of the transport medium in the way which is usual by providing suction blower below the transportation band, then a difference in pressure will be created between the transport medium before and after the transportation band or in any case a pressure drop will be created during the passage of the transport medium through the transport band or collection band. As a matter of fact it has been proved that the pressure drop which occurs when the transport medium passes through a non-loaded transport band is so small, anyhow constant, that it may be disregarded in the present connection, but when a mineral wool mat has been deposited on the collection band this mineral wool mat will create a resistance of a characteristic order of magnitude. This resistance thereby is completely or close to completely proportional to the thickness of the deposited mineral wool mat, provided that this has a constant tightness and in a corresponding way the resistance will be proportional to the density if the thickness is constant. In combination, this means that the resistance across the transport band with the mineral wool mat deposited thereon will in a clear way vary with the amount of mineral wool in the mat. For the purpose of simplification, one may use the sub-pressure of the transport medium after its passage through the collection band as a measure of said pressure drop.

Because of the tightness by which the mineral wool mat is deposited on the collection band, provided that rather constant working conditions exist in other respects, e.g. with respect to the character of the melt, is substantially the same, this co-variation will be extremely reliable.

Thus, one may as a first improvement of the above mentioned method provide the prognosis regarding the surface weight of the formed mineral wool mat by researching and determining the properties of the transport medium. A condition for this is that the speed of movement of the band either is constant or that variations in said speed of movement of the band are observed and are introduced as a variable when forming the prognosis as described above. The prognosis thus obtained of course thereafter has to be subjected in the way described above to a control by weighing the formed mineral wool mat.

In the tests forming basis of the present invention, it has also been found what properties of the transport medium may, in the first place, be used for sensing and introduction into the prognosis analysis. As has previously been mentioned, the pressure drop through the mat of the transport medium passing through the mat forms one such variable. For the matter of simplification it is possible in many a case to assume that the pressure on the entrance side of the mat by the transport medium is constant, and in such a case one may measure the pressure on the side below or on the exit side of the transport medium during its movement through the mat. This reading preferably is made by means of an electrical pressure transducer, which is connected to a gas pressure measuring instrument, so that the electrical indication, for instance in the form of a voltage, may be transferred to the counter apparatus 20.

It should be observed that the mat in most spinning methods is built up successively on a moving band, for instance the band 33, such that the mat 39 will be rather thin close to the spinner unit 13 but will successively increase as to its thickness during the movement of the band 33 in the direction away from the spinner unit 13, and consequently the mat will not get its final thickness until it is situated at a large distance from the spinner unit 13, so that no further mineral wool will be fed to the mat. It will be evident from this that the most reliable value of the pressure drop when the transport medium passes through the mat or of the sub-pressure after the transport medium has passed through the mat will be obtained if the measurement is made at such a large distance from the spinner unit 13, that the mat 39 may be regarded ready built up.

However, there are other ways to measure the properties of the transport medium.

It is evident that the tighter or more detail the mineral wool mat is at the place where the measurement of the properties of the transport medium is made, the greater will the resistance be against movement of the transport medium, and this will react in turn on the power consumption of the means used for driving the blower for creating the sub-pressure. Therefore, one may use this fact by providing a separate motor for driving the blower, not in common to the remaining motors existing in the system, e.g. the motors 30 and 35, and to measure the power consumption of this separate. This measurement may be made either by measuring the current to the motor, for instance if the motor is a three phase motor, by means of an ampere meter in one of the feeder phase conduits, or by measurement of the actual power requirements by means of a watt meter. The most suitable way for driving the blower concerned would be by means of a short circuited three phase motor. The changes in lag of the motor when altering the load are so small that they may as a rule be neglected, and consequently the need of power may be decreased or regarded as a distinct expression of the resistance against movement of the transport medium through the mineral wool mat formed, and consequently also for the amount of mineral wool in said mat at the place where the measurment is made. In this connection it should be noted that a blower may be regarded a rotary means which has two functions to fullfill, viz. firstly to overcome the bearing and air frictions which are always small and may therefore be neglected, and secondly putting the transport medium into movement i.e., causing movement of the transport medium, and that consequently in a way, known per se any power driven motor will run practically on idle, if the feed of medium is choked, which would otherwise be put in movement by the blower. In other words: the greater the resistance the mat causes to the movement of the transport medium, the less of said medium will pass through the mat, and the less will be the power consumption of the blower motor.

It has previously been mentioned that the transport medium usually comprises combustion gases or air or a mixture of combustion gases and air. In most cases the temperature of the transport medium is considerably lower the the temperature of the melt to be transformed into fibres. If non-preheated air is used, then this temperature will usually be equal to the temperature in the space surrounding the equipment, from which the air is collected. A heating of the transport medium therefore is unavoidable by heat transfer from the hot mineral material to the transport medium. Also this heating will be in a given relation to the amount of mineral wool deposited in the formed mat, and this will apply to a higher degree than the amount of melt 12 given off from the melting equipment 10. This may be explained in the most simple way as follows:

The formed fibres have a heat transfer surface which is extremely large in relation to their mass. Therefore, they deliver their surplus of heat practically momentarily to the transport medium. If the fibration procedure should run in such a way that part of the amount of melt delivered is not fibrated, this will result in particles, which, due to their magnitude, will give off their heat so slowly to the transport medium that they will leave the process with a substantial amount of residual heat. The relation is accentuated by the fact that the mineral wool fibres have usually radius which are of the same order of magnitude as the wave length of the infra-red ight at the temperature concerned. The reason for this is not well understood, but the phenomenon has been observed without the slightest doubt. Thus, the delivery of heat from a product increases more rapidly than may be explained exclusively by the increased surface at fibration to small diameter, as soon as the diameter will be on the order of magnitude of the wave length of the infra-red light. There is a reason to believe that the phenomenon is in one way or another dependent upon a resonance phenomenon inside of the fibrous material.

When the fibres have thus been drawn out so far that they will have the dimensions referred to above, a rather sudden increase in the delivery of heat will take place and the amount of heat given off by convection will be increased by the addition of heat radiation, which is delivered from the fibres directly to the surroundings, i.e., to the transport medium. Before the fibres obtain these dimensions, the delivery of heat takes place by radiation, so that the radiation from the interior part is absorbed in the parts disposed further outward in the material. The heating caused thereby will provide a secondary heat radiation. The secondary heat radiation will now take place from a lower temperature level. As the amount of energy given off by heat radiation per unit of time is dependent upon the fourth power of the absolute temperature, it will also be obvious, that the direct radiation, regarded as a heat transfer mechanism, must be more effective than a repeated absorption and re-radiation.

Therefore, the formed fibres transfer their surplus of heat more effectivly to the transport medium than do the particles of melt which have not yet been fibrated. The heating of the transport medium thus to a higher degree will reflect or indicate the amount of fibres than does the amount of melt fed. This improves the possibility of creating a reliable prognosis and is a very essential advantage.

If, for instance, the amount of deposited mineral wool should increase, then also the resistance against the movement of the transport medium will also increase, and the amount of moving transport medium per unit of time will decrease, assuming that no specific steps are taken in order to keep the flow of transport medium constant, by heat transfer from the mineral wool to the transport medium, the temperature of this medium after having passed through the formed mineral wool mat will in this case also be higher than would otherwise be the case. As a matter of fact, therefore, the temperature of the transport medium rises more quickly than a rise in direct proportion to the increased amount of mineral wool, and one will therefore get a very sharp indication or criterion of the amount of mineral wool.

If, now, the transport medium fed should have a constant temperature, usually equal to the temperature of the outside atmosphere, then it will be sufficient to measure the temperature of the transport medium at a place immediately after said transport medium has passed through the mineral wool mat, but in any case in a place, where the temperature sensing means is not affected by radiation heat from the running band or the formed mineral wool, resp. This temperature is read by means of some device, which may for instance produce a voltage proportional to or dependent upon the temperature, said voltage being transferred the the counter unit 20, which has provided the prognosis regarding future formation of mineral wool. If, on the other hand, the transport medium when entering the said section has an undetermined temperature or a temperature which may be variable, one should instead use one temperature sensing means, applied both before and after the passing of the transport medium through the mineral wool mat and deduce the difference in temperature or, in other words the rise in temperature, and a corresponding expression therefore should be fed to the counting unit 20.

It will be evident from the above that there is a given relation, however not necessarily a relation of proportionality, between the flow of transport medium, on the one hand, and the amount of deposited mineral wool, on the other hand. This relation, thus, can be measured in several different ways, for instance, as mentioned above by measuring the rise of temperature. It also possible to measure the amount of moving transport medium per unit of time or in other words, the speed of movement of the transport medium directly, and one may then as well use the expression for this relation as an indication of the amount of deposited mineral wool. For providing a measurement of the speed of movement proper of the transport medium, one may use some arrangement, which is known per se for measuring speeds of movement, for instance a Pitot tube, perhaps balanced by means of a pressure reading tube, in a way which is well known e.g. from vessel loggs, and for measurement of the total amount of moving transport medium, one may use an anemometer. It has proved especially advantageous to use a thermo-electrically acting anemometer also called a "hot-wire-anemometer", because from such an anemometer one will provide a direct expression in the form of an electric resistance an electric current or an electric voltage, said expression being fed without change into the counting unit 20.

In some cases it may be desired in order to obtain constant working conditions in a refinement system, which the transport medium has to pass, to keep the flow of transport medium constant, and arrangements for such a purpose are known per se. However, they have one property in common, viz. that is an increase of the force for putting the transport medium into movement, there will also take place an increase of the power of the motor for driving the blower. Perhaps it may be more suitable in this connection to measure the rotational speed of the driving motor by means of a tachometric generator or some similar instrument. Also in this case, the reading may be used as an indication of the amount of deposited mineral wool at the place of measurement, and this reading may as well in this case be introduced into the counter unit 20 for providing the prognosis, which should be compared with the amount of deposited mineral wool stated by means of the balance 41, 42, and for providing correction steps in order to obtain a constant amount of mineral wool 39 deposited per unit of time or per unit of length of the band 33 and thus to provide a constant surface weight of this mineral wool.

It will be evident from the above that one has a lot of ways to proceed when using properties of the transport medium for an indication of the amount of deposited mineral wool, and that the choice of which of these many properties is the most favorable one in each separate case must be dependent upon the specific circumstances in the existing case.

However one is not bound only to rely on the properties of the transport medium, but there are also possibilities to use other variables for the purpose concerned, either each per se or in combination with some other variable, which depend upon the changes in properties of the transport medium.

Amongst such other variables the delivery of heat to the walls of the collection device 36 may be mentioned. It should be noted, that the formed mineral wool is blown by a stream of transport medium from the spinning unit 13 to the continuously moving band 33 by means of the blower 35 or perhaps by means of some other pressure creating device. One may either provide a blower in the way, shown at 35, before the band 33, or a suction blower below the band 33. The transport medium is removed in this way from the mineral wool, which remains on the band 33. In both cases, it is required, for practical reasons, fully or in part to enclose the section 36, within which deposit of mineral wool takes place, and this enclosure thereby will comprise also side walls and upper walls or a roof, the latter however being employed only in such places where there is no deposit of mineral wool. Rather often no such roof is used but only side walls in the collection device 36, said side walls having the main purpose of conducting the stream of transport medium in the same way as the channel 34 onto the mat of mineral wool.

It is then also unavoidable that the melt will, during the fibration, give off a part of its heat, which cannot be disregarded, substantially by radiation, to the side walls. Their temperature will thereby rise, until the temperature reaches a stable value, at which value the feed of heat from the mineral wool corresponds to the heat, given off to the surroundings, substantially by radiation and convection to the surrounding part of the system or to the surrounding air, resp.

In this way, the temperature of the parts of the system forming the enclosure, will also provide an indication of the amount of mineral wool produced, and this temperature may easily be read by means of some electrically recording thermometer or some similar device, e.g. a thermistor, the reading of which is fed to the counter unit 20 as one of the indications contained therein for prognostication of the production of mineral wool, so that thereafter said prognosis will be compared with the actual value, provided by weighing the mineral wool mat by means of the balance device 41, 42.

In the tests forming the basis of the present invention, it has proved especially advantageous to use either a photocell sensitive to infra-red light for the reading of the infra-red light from the melt during the fibration, or a photo-multiplicator. The last mentioned device, of course, should be well protected for instance against spatters of melt or of binding means.

The dividing line between light radiation and heat radiation, of course is in this case indistinct. The temperature of the melt during its re-shaping into mineral wool will follow a strongly sloping curve, which nevertheless is rather similar from one time to another. The radiation emitted from the melt under fibration—both the visible and the infra-red one—will then to an essential degree be dependent upon the amount of melt which is at a given moment of time under fibration. Thus one way with equal effect measure either the heat radiation in the way mentioned above, or the light radiation by means of a light sensor, which one will have to direct onto the mineral melt, well protected against foreign light. The greater the amount of mineral wool is formed at one time, the stronger will be the radiation of light therefrom.

It will also be evident from the above that independently of whether the heat radiation is measured or the light radiation from the mineral wool mat, the measuring result will be dependent in a given way on the flow of material in the process. An increased flow of material through the process will mean that a given volume of the transport medium will contain more mineral fibres than earlier. This increase is amplified if the increased flow of material causes, secondarily, a decreased flow of transport medium. In any case, now an increased rolling of the transport medium will take place. This rolling or "turbidity" may be measured by irradiation of the transport medium and measuring the light absorption in the same, or, expressed differently, the light transparency of the same. This irradiation may preferably take place by means of a very distinctly directed bundle of light rays across the transport medium, where the concentration of the mineral fibres and thereby also the rolling is at maximum. It is also advantageous to use visible light but in such a case steps will be required to prevent disturbances from other visible light existing in the surroundings. Still better then is the use of ultra-violet light, which, according to what one knows by experience, exists to a very small extent in such workshop and manufacturing localities, where mineral wool is manufactured. However, one may also use a laser beam for this purpose, whereby one will in a very effective way concentrate the light with respect to direction as well as to wave length, so that no disturbances from light in the surroundings may be feared. Another way would be to use polarized light, which will very easily be separated from the normal light existing in the surroundings.

Polarized light may also be used the way that one measures the light intensity in another level of polarization than the one for the entrance ray. This provides a further advantage. When the polarized light hits a hovering fibre, the polarization level will be changed due to reflection against the fibre surface, such that it will be determined by the position of the fibre at the moment of reflection. Now, the orientation of the fibres within the transport medium is not dependent upon chance but is at least to some extent systematic. This means that the intensity of the light output will be greater in a given polarization level than in other such levels. Investigations, made in connection with the present invention, have proved that this polarization level is in parallel with the flow of the medium. Therefore, it has proved advantageous to use an input light, the polarization level of which forms a given angle with the direction of the flow of medium, preferably such a great angle that it may reliably be separated from the direction of the flow of medium. Hereafter, one need only detect the output light in a polarization level coinciding with said direction.

If irradiation along with a measurement of the light absorption or the light transparency in the mineral wool mat is used in the way described above, it may however happen that erroneous indications will be produced for one reason or another, which cannot be anticipated such as the flow of transparent medium accidentally changing its path. In order to avoid an erroneous indication being fed to the prognosis producing counter unit 20, one should in the case of an irradiation use a plurality of rays across the stream of medium and provide a result based on all of the readings, for instance by addition or by mean value calculation, so that such errors are avoided as fas as possible.

It will be difficult to avoid a given dispersion of the irradiating light through the mineral wool mat because it is inevitable that this light will hit fibres in the mineral wool mat running in rather random or irregular directions and be further reflected by them in still more irregular directions, representing paths which cannot be calculated. Hereby a process of diffusion will be created, which has been called "turbidity" of the irradiating light, which means that the rays of light pass through the irradiated material in widely directions, and a diffuse light will pass from the irradiated. Also such diffuse light may be used as an indication of the tightness (density) or thickness of the mineral wool mat; the light detector must however to be placed in another position than in alignment with the input direction of the primary ray. For this purpose ordinary visible light may be used or ultra-violet light, and a laser ray or beam may also be used. The last mentioned technique has proved to give very great advantages for the reason that, when a laser ray is used, it will be possible to create extremely intense irradiation and thus to obtain high intensity diffused light. As the laser light is monochromatic, the light reading is also arranged monochromatically, and thereby it will be possible to a substantial degree to avoid disturbances from other light present, especially from the still glowing mineral fibre mass.

An other practical way of measuring the variable concerned is to measure the feed of melt in the stream of melt flowing out from the melting oven in order to be fed to the spinning unit. This way, thus, may be used instead of weighing the oven by means of pressure cells 21 and the means 24, 25 and 26 connected thereto, such as has been described above. From the science of highly viscosous mediums in movement it is known that a freely falling stream is subjected to an acceleration, and that it will in each separate section beginning a small distance from the spout 11 of the melting oven 10, due to the strong surface tension, assume a practically completely regular circular cross section area. Due to the successive acceleration the diameter of this area will successively decrease, and one may therefore obtain an indication of not only the particle speed of the melt but also about the area in the measurement cross section by optically measuring the diameter of the stream of melt in two places at a given distance from each other, and thereby one will consequently get a very exact indication of the amount of melt fed to the spinning unit A fraction of this melt usually forms pearls, and it happens that these pearls are separated on specific order, but there is no difficulty in weighing them, and, therefore, one has to calculate the part of the melt which is not transformed into pearls, all of this part forming the material for the fibration. This part, therefore, is equivalent to the volume of the melt, transferred to the transport and collection band as fibres.

Usually the melt fed to the spinning unit 13 in the form of the stream 12 has a constant composition at least during each run of the same spinning procedure. It also desirable to keep a very close to constant temperature of the melt 12 running from the melting oven 10, which also usually is obtained. The amount of heat thereof per unit quantity of melt or per unit quantity of fibrous material formed, resp., therefore is very close to exact, and as a consequence thereof it is also possible to use this amount of heat as a measure o the quantity of fibrous material formed. There is no effective way of reliably measuring this heat content in a direct way, but an indirect way, which has in tests proved to be exceedingly reliable is to measure the heat transfer through the cooling medium, usually cooling water, by which normally the parts contained in the spinning unit are cooled, especially the spinner wheels 13.

It is preferred, therefore, to control the feed of cooling medium in order of keeping the temperature constant in one or more places in the spinning unit 13, the thereby, thus, the quantity of cooling medium will be the carrier of an indication of the amount of heat removed by this cooling procedure from the melt or the fibrous material formed therefrom.

Mineral wool, to a great extent, is used as a sound absorbing or sound insulating material, resp., especially in buildings. This sound absorbing or sound insulating property is not one which the mineral wool obtains only when leaving the production line but it exists also when the mineral wool mat rests on the collection band 33. Therefore, there is also a possibility to provide one of the variables to be introduced into the counter unit 20 by subjecting the mineral wool mat to a strong sound wave, preferably as well directed as possible, and to measure the sound absorption or sound insulation, resp., provided by the mineral wool mat. Of course, it is important therefore that a sound frequency be used which does not otherwise exist or in any case only exists within the locality to a negligible extent, where the production of the mineral wool takes place. Further one should use a high intensity sound wave for the measurement.

In all production of mineral wool by centrifugation, inavoidable formation of so-called pearls will occur. These pearls are small lumps of melt forming fully or close to fully spherical bodies of a rather small dimension which are however not desirable in the mineral wool mat comprising the fibrous material. These pearls, as a rule, are previously removed at the inlet of the product from the spinning unit 13 to the collection band 33. This will take place more or less automatically by virtue of the fact that the pearls have a greater movement energy in relation to their volume than does the mineral wool proper. Therefore, they will be caught to a smaller extent or perhaps not at all by the stream of gas and/or air used as a transport medium, and they may therefore easily be made to fall out of the path of movement at a predetermined location, before the mineral wool starts being deposited on the transport and collection band 33. Investigations now have proved that these pearls during their movement out of the path of production possess an energy of motion which is directly proportional to their total mass. This mass, in turn, is in some kind of proportion to to the total stream of melt, which determines again the amount of mineral wool formed per unit of time. The motion i.e., energy movement, of the pearls can, in this way, be regarded a measure of the amount of formed mineral wool, and by measuring the total motion energy one may therefore get a value indicating the magnitude of the fibre forming mass.

This method, however, may be still more usable if it is combined with a simultaneous measurement of the flow of melt proper. The amount of mineral wool formed, then, may be rather accurately determined as the difference between these two magnitudes.

Therefore, when measuring the motion energy, it is suitable to provide a wall or any other surface in such a way that it will, in a direction which is as close to perpendicular as possible, absorb the percussions or impacts from the leaving pearls and measure the total percussion energy. Recording instrument which may be used for this purpose are well known in art. Such instruments can produce an electrical voltage which is directly proportional to the combined percussion energy, and this electrical voltage then may be fed to the counter unit 20 in order to provide the prognosis about future formation of mineral wool, which should be compared with the actuator real, subsequently existing formation of mineral wool, as this is determined by weighing in the apparatus 41, 42.

In a corresponding way, it is also possible to combine two or more of the indications referred to above into the counter unit 20 and thereby further to improve the accuracy in the executed control when creating the prognosis concerned with respect to future formation of mineral wool.

A lot of the ways described above for providing some kind of an indication to be fed to the counter unit 20 have been described as if they are to be provided in immediate connection to the collection and transport band 33. There is, however, nothing to prevent, a mode of operation wherein after the mineral wool mat has left this collection and transport band said mineral wool mat is guided over to a separate subsequent band, referred to hereinafter as the "measurement band", which may be arranged in the way which has been decribed above with respect to the band 40, and in which some of the observations are made which have been described above. This especially applies to the indications which are derived from the variable resistance of the mineral wool mat against traversing medium. As a matter of fact essential advantages may be gained thereby, which will, as a rule compensate for the negative consequence of the unavoidable delay in the indication.

If the indications are exclusively derived in some of the said ways described previously, before the mineral wool mat has been made ready and has been transferred to the subsequent measurement band, there will be a some difficulty in controlling the properties of the mineral wool mat in any other direction than the longitudinal direction thereof. Usually one will therefore only obtain a mean value of the properties, possessed by the mineral wool mat in the different places across the longitudinal direction of the mat. No data will be obtained about transverse variations in tightness, thickness and surface weight between such parts of the mineral wool mat which are for instance situated in its middle part and at its edge parts.

Of course, such data will be of the greatest importance when the question is one of providing a mineral wool mat having constant surface weight over all of its surface, said surface being two dimensional, one of said dimensions certainly running in the longitudinal direction of the mat, and the other one running the transverse direction of the mat. By making a measurement at a subsequent separate measurement band, one will also be provided with the for control of variations in the transverse direction.

An arrangement which may advantageously be used for controlling the distribution of the deposited mineral wool, so that this mineral wool will be evenly distributed over all of the transverse section of the collection band 33, is described in the U.S. Pat. No. 3,032,836.

In the said arrangement according to the U.S. patent in question, the distribution of mineral wool across the direction of movement of the collection band or the transport band, resp., is determined, and the result of this determination is fed back to an upstream location on the collection band in order to provide equalizing of the distribution of mineral wool in a transverse direction, so that it will be as even as possible.

Thereby it is especially suitable to divide up the flow of air in a plurality of parts, preferably of equal width and running the length of the mineral wool mat. The difference in transparency of the air thus is introduced into a control unit, which is provided to influence the transverse distribution of the mineral wool so that it will be as even as possible.

We claim:

1. A method for controlling the surface weight of a mineral wool mat in a production process in which fibres of mineral wool are produced by spinning of a mineral melt and mineral wool formed from the fibres is transferred to a collection device by means of a transport medium comprising a stream of gas, said stream of gas being separated from the mineral wool in said collection device, and the mineral wool forming a mat on a collection band, said method further comprising measuring at least two variables which influence the amount of mineral wool formed per unit time and predicting, based on said measurements, the amount of mineral wool formed per unit time at a pre-future point in time, determining, by weighing, the surface weight of the formed mineral wool mat, measuring the speed of the collection band, utilizing the measured surface weight and measured collection band speed to determine the actual amount of mineral wool formed per unit at said predetermined point in time, comparing the actual amount of mineral wool formed per unit time with the predicted amount of mineral wool formed per unit so as to determine the error in the predicted amount, updating the measurements of the at least two variables, and providing a new prediction for the amount of mineral wool formed per unit time at a further point in time, based on the error in the earlier prediction and the updated measurements, so as to minimize the error in the new prediction, whereby the error of each new prediction is adaptively minimized, said method further comprising utilizing a control unit to control the surface weight of the formed mineral wool mat in accordance with the predicted amount of mineral wool formed per unit time.

2. A method according to claim 1, in which one of the variables measured is the consumption of power by a motor driven fibration unit during the spinning of the mineral melt.

3. A method according to claim 1 or 2, in which one variable measured is the amount of mineral melt produced by a mineral melting system and measured as the decrease of weight of said melting system.

4. A method according to claim 1, in which the surface weight of the formed mineral wool mat is determined by causing the mineral wool mat to pass over a roller which controls the output of a pressure sensor in response thereto.

5. A method according to claim 1, in which a plurality of variables used are processed by feeding momentary values thereof determined at a particular point in time to a counter unit in which these values are combined with stored momentary values from at least one preceeding time period to provide mean value for the variables for a given time period.

6. A method according to claim 5, in which the said mean values for the variables are utilized to control the speed of movement of the collection band.

7. A method according to claim 5 or 6, in which the momentary values are utilized to a successively decreasing extent in determining the mean value of at least one of said variables and thereby to affect control of the speed of movement of the collection band to a decreasing extent such that the more distant in time the momentary value is, the less the effect thereof.

8. A method according to claim 7, wherein a given mementary value is utilized to affect the determination of the mean value of the speed of movement of the collection band to an extent which is in a given proportion to the next preceeding such momentary value, such that the effect of the momentary value determined just prior to the actual control period will have a greater effect than the momentary value determined just prior thereto in time.

9. A method according to claim 5 in which each period for determining the mean value of any one of said variables has a given duration determined by a timer.

10. A method according to claim 1 in which two said variables are utilized and combined according to the formula $F(p,q) = a \cdot p + b \cdot q + c$, where p and q are the variables and a, b, and c are constants.

11. A method according to claim 1, in which the speed of movement of the collection band is supplementally controlled by a controller in accordance with the surface weight of the mineral wool mat as determined by weighing.

12. A method according to claim 11, in which the supplemental control is provided to influence the speed of the collection band to same extent as the main control determined from the predicted amount of production per unit time.

13. A method according to claim 1 further comprising measuring the at least one property of the flow of gas by which the mineral wool is transferred to the collection band which is related to the characteristics of the mineral wool mat and utilizing said measurement as at least one of said variables.

14. A method according to claim 13 further comprising measuring the difference in pressure between the input and the output side of the said flow of gas during the movement of the fluid through the formed mineral wool mat and the collection band, and utilizing this measurement as one of the said variables.

15. A method according to claim 14, in which the pressure of the flow of gas on the said inlet side is kept constant and the difference in pressure is measured in terms of the pressure of the gas after the flow thereof through the mineral wool mat.

16. A method according to claim 15 wherein a suction blower is provided below the collection band for providing the measured output side pressure.

17. A method according to claim 14, in which pressure measurement is converted into an electrical voltage.

18. A method according to claim 1 further comprising measuring the amount of heat transferred from the formed mineral wool to the walls of the collection device, said walls being provided for guiding the flow of the gas used as a transport medium during the deposition of the mineral wool on the collection band, and the measured value of the amount of heat transferred being utilized as one of said variables.

19. A method according to claim 1, further comprising measuring the temperature of a part of the system which is in a position in relation to the produced mineral wool mat such that the part will receive heat from the mat, and utilizing said temperature as one of said variables.

20. A method according to claim 19, wherein at least one electrically recording thermometer is used to indicate said temperature.

21. A method according to claim 19, wherein at least one thermistor is used to indicate said temperature.

22. A method according to claim 1, further comprising measuring the light radiation from the melt used in producing said fibres, a signal corresponding to said light radiation being utilized as one of said variables.

23. A method according to claim 22, in which an infra-red light sensitive photocell is used for said light radiation measurement, and said signal comprises an electrical voltage.

24. A method according to claim 1, in which the formed mineral wool fibres are irradiated with light, and the amount of light absorption is determined, a signal corresponding to the amount of light absorption being utilized as one of said variables.

25. A method according to claim 24, wherein a source of light is used for the irradiation of the mineral wool fibres which emits a sharply directed bundle of light.

26. A method according to claim 25, wherein a source of light is used for the irradiation of the mineral wool fibres which produces at least one of either visible light or ultraviolet light.

27. A method according to claim 24, in which a source of light is used for the irradiation of the mineral wool fibres which emits a laser beam.

28. A method according to claim 24, in which polarized light is used for the irradiation of said mineral wool fibres.

29. A method according to claim 28, in which a light beam from the light source is used to irradiate said fibres which forms an acute angle with the direction of the flow of gas.

30. A method according to claim 28, in which the light radiation is detected after passing through said fibres along a line at a predetermined angle with the direction of the input light, said line along which detection takes place being parallel to the direction of the said flow of said gas.

31. A method according to claim 24, in which said light radiation is diffused by the mineral wool fibres and the diffused light is detected.

32. A method according to claim 24, in which said light radiation comprises a plurality of rays of light which intersect the mineral wool fibres in different places and at different angles.

33. A method according to claim 32, in which the measurements obtained from the different rays of light are weighted in a predetermined manner.

34. A method according to claim 33, in which said weighting of the said measurements includes elimination of extreme values including values associated with small amounts of fibres.

35. A method according to claim 1, further comprising measuring the power consumed by a blower for creating said flow of gas, a corresponding signal being derived which is utilized as a measurement of the amount of mineral wool produced per unit of time.

36. A method according to claim 1 further comprising measuring the amount of heat per unit time transferred from the melt to the said flow of gas during the production of fibres from the melt, and utilizing the result as one of the variables.

37. A method according to claim 36, in which the amount of heat given off per unit of time is measured in terms of the difference between the input temperature of the gas prior to the use thereof as a transport medium for the mineral wool and the output temperature of the gas after its separation from the mineral wool mat.

38. A method according to claim 37, in which gas of a known, constant input temperature on the input side is used as a transport medium for transporting the mineral wool from a spinning unit to the collection band and the difference in temperature measured is the difference between the input temperature and the output temperature.

39. A method according to claim 36, in which the temperature measurement takes place at a location where the flow of gas is not subjected to effects of radiant heat.

40. A method according to claim 1, further comprising measuring of the said speed of movement of the flow of gas used as a transport medium for the formed mineral wool mat and using the same as one of said variables.

41. A method according to claim 40, wherein the speed of movement of the flow of gas is measured by means of a Pitot tube in terms of the difference between the indication of the Pitot tube and the indication of a stabilization tube.

42. A method according to claim 40, in which the measurement of the flow of gas is made using an anemometer.

43. A method according to claim 42 wherein said anemometer comprises a hot-wire anemometer.

44. A method according to claim 1, in which the speed of a motor for causing movement of the gas formed transport medium for the formed mineral wool is controlled so as to produce a constant flow of said medium, and the rotational speed of the said motor is measured, and an electrical voltage related thereto is utilized as one of the variables.

45. A method according to claim 44, in which a tachometer generator is used to measure the speed of the motor which produces a voltage proportional to the rotational speed.

46. A method according to claim 1 further comprising measuring the quantity of the melt transferred from a melting oven to a spinning unit per unit of time, and utilizing a signal related to this measurement as one of said variables.

47. A method according to claim 46, in which measurements are made of the thickness of the stream of the melt passing from the melting oven at least two locations separated by a given distance from each other, and the amount of melt transferred to the spinning unit is determined on the basis of the result of the last mentioned measurement and the distance between the measurement locations.

48. A method according to claim 46, in which pearls formed at the spinning unit are separated and the amount of said pearls formed per unit of time is measured and subtracted from the result obtained from the measurement of the quantity of the melt transferred from the melting oven to the spinning unit.

49. A method according to claim 1, further comprising cooling at least one part of a spinning unit used in producing said fibres using a cooling medium, and measuring the amount of heat transferred to said cooling medium based on the product of the flow of the cooling medium per unit of time and the rise in temperature thereof, a signal relating to the last mentioned measurement being utilized as one of the variables.

50. A method according to claim 49, in which the temperature of the cooling medium leaving the spinning unit is maintained constant, and the amount of cooling medium per unit of time is measured.

51. A method according to claim 1, in which the mineral wool carried by the flow of gas is subjected to a high intensity sound wave and the decrease of power of this sound wave is measured during the passage thereof through the mineral wool, a signal related to the last mentioned measurement being utilized as one of said variables.

52. A method according to claim 51, further comprising using a sound wave of a selected frequency which is different from the frequencies of other sounds existing in the locality within which said process for producing mineral wool takes place.

53. A method according to claim 1 further comprising measuring a characteristic of pearls which are produced during the spinning of the mineral wool before the mineral wool has been transferred to the collection band, and utilizing a signal related to the last mentioned measurement as one of said variables.

54. A method according to claim 53, in which a screen is provided in the path of the pearls which are separated from the fibers, said screen being positioned substantially transverse to the direction of movement of the pearls said method further comprising measuring the percussive force of the pearls on the screen.

55. A method according to claim 1, in which the formed mineral wool mat is guided over a band conveyor located downstream from the collection band, said method further comprising measuring the transparency of the mineral wool mat by the application of a pressure difference of known magnitude across the mat along with the conveyor band, the flow of air through the mat along with the conveyor band due to said pressure difference being utilized as one of said variables.

56. A method according to claim 55 further comprising measuring the distribution of mineral wool transverse to the direction of movement of the collection band and the band conveyor, and utilizing the result of the last mentioned measurement at an upstream location along the collection band to provide equalization of the distribution of mineral wool in the transverse direction.

57. A method according to claim 55, in which the flow of air is divided up into a plurality of equal widths across the direction of movement of the mineral wool mat, and the difference in transparency is utilized to control the transverse distribution of the mineral wool so as to make this distribution substantially equal across the width of the mat.

* * * * *